United States Patent
Raz et al.

(10) Patent No.: US 11,630,669 B2
(45) Date of Patent: *Apr. 18, 2023

(54) DYNAMIC ALLOCATION OF EXECUTABLE CODE FOR MULTIARCHITECTURE HETEROGENEOUS COMPUTING

(71) Applicant: Next Silicon Ltd, Tel Aviv (IL)

(72) Inventors: Elad Raz, Ramat Gan (IL); Ilan Tayari, Tzur Hadassa (IL)

(73) Assignee: Next Silicon Ltd, Givatayim (IL)

( * ) Notice: Subject to any disclaimer, the term of this patent is extended or adjusted under 35 U.S.C. 154(b) by 57 days.

This patent is subject to a terminal disclaimer.

(21) Appl. No.: 17/406,151

(22) Filed: Aug. 19, 2021

(65) Prior Publication Data
US 2022/0253312 A1 Aug. 11, 2022

Related U.S. Application Data

(63) Continuation of application No. 17/172,134, filed on Feb. 10, 2021, now Pat. No. 11,113,059.

(51) Int. Cl.
*G06F 9/30* (2018.01)
*G06F 8/41* (2018.01)
*G06F 9/50* (2006.01)

(52) U.S. Cl.
CPC ............ *G06F 9/3005* (2013.01); *G06F 8/447* (2013.01); *G06F 9/5044* (2013.01)

(58) Field of Classification Search
CPC ....... G06F 9/3005; G06F 9/5044; G06F 8/447
See application file for complete search history.

(56) References Cited

U.S. PATENT DOCUMENTS

| 5,734,908 A | * | 3/1998 | Chan ................ | G06F 8/445 717/154 |
| 6,609,248 B1 | * | 8/2003 | Srivastava .......... | G06F 8/447 717/148 |

(Continued)

OTHER PUBLICATIONS

Notice of Allowance dated May 12, 2021 From the U.S. Patent and Trademark Office Re. U.S. Appl. No. 17/172,134. (14 Pages).

(Continued)

*Primary Examiner* — William B Partridge
*Assistant Examiner* — Kasim Alli (57) ABSTRACT

An apparatus for executing a software program, comprising processing units and a hardware processor adapted for: in an intermediate representation of the software program, where the intermediate representation comprises blocks, each associated with an execution block of the software program and comprising intermediate instructions, identifying a calling block and a target block, where the calling block comprises a control-flow intermediate instruction to execute a target intermediate instruction of the target block; generating target instructions using the target block; generating calling instructions using the calling block and a computer control instruction for invoking the target instructions, when the calling instructions are executed by a calling processing unit and the target instructions are executed by a target processing unit; configuring the calling processing unit for executing the calling instructions; and configuring the target processing unit for executing the target instructions.

22 Claims, 4 Drawing Sheets

(56) References Cited

U.S. PATENT DOCUMENTS

| | | | | |
|---|---|---|---|---|
| 6,802,056 | B1* | 10/2004 | Chaiken | G06F 8/52 717/136 |
| 8,789,063 | B2* | 7/2014 | Hodson | G06F 9/541 717/149 |
| 2004/0098373 | A1 | 5/2004 | Bayliss et al. | |
| 2004/0255279 | A1* | 12/2004 | Rawsthorne | G06F 9/30065 717/136 |
| 2005/0055594 | A1* | 3/2005 | Doering | G06F 1/12 712/34 |
| 2005/0149915 | A1* | 7/2005 | Wu | G06F 9/45516 717/137 |
| 2008/0163183 | A1* | 7/2008 | Li | G06F 8/456 717/149 |
| 2010/0094933 | A1 | 4/2010 | Hickson et al. | |
| 2013/0179733 | A1 | 7/2013 | Frank et al. | |
| 2019/0042217 | A1* | 2/2019 | Glossop | G06F 8/441 |
| 2020/0409697 | A1* | 12/2020 | Ould-Ahmed-Vall | G06F 9/3005 |
| 2021/0029219 | A1 | 6/2021 | Kamran et al. | |

OTHER PUBLICATIONS

Notice of Allowance dated Jun. 16, 2021 from the U.S. Patent and Trademark Office Re. U.S. Appl. No. 17/141,267. (4 pages).
Official Action dated Feb. 18, 2021 From the U.S. Patent and Trademark Office Re. U.S. Appl. No. 17/141,267. (11 Pages).
Official Action dated Apr. 28, 2021 From the U.S. Patent and Trademark Office Re. U.S. Appl. No. 17/141,267. (12 Pages).

* cited by examiner

DYNAMIC ALLOCATION OF EXECUTABLE CODE FOR MULTIARCHITECTURE HETEROGENEOUS COMPUTING

RELATED APPLICATION

This application is a continuation of U.S. patent application Ser. No. 17/172,134 filed on Feb. 10, 2021, the contents of which are incorporated herein by reference in their entirety.

FIELD AND BACKGROUND OF THE INVENTION

Some embodiments described in the present disclosure relate to a computing apparatus and, more specifically, but not exclusively, to a heterogeneous multi-architecture computing system.

In the field of computing, the term performance refers to an amount of useful work performed by a computerized system. Some characteristics of useful work include the rate at which work is performed, utilization of computation resources, for example an amount of memory used or an amount of network bandwidth consumed, and an amount of time it takes the computerized system to react to input. There are a variety of metrics for measuring the amount of useful work. Some metrics are specific to a context of the computerized system; some other metrics are generic metrics that may be measured in a variety of computerized systems.

As used herein, the term "processing unit" is used to mean any kind of programmable or non-programmable circuitry that is configured to carry out a set of operations. A processing unit may comprise hardware as well as software. For example, a processing unit may comprise one or more processors and a transitory or non-transitory memory that carries a program which causes the processing unit to perform the respective operations when the program is executed by the one or more processors.

In addition, as used herewithin, the term "improving performance" refers to improving one or more performance scores measured, or computed, according to one or more performance metrics. Two common metrics used to measure a processing unit's performance are latency and throughput. Latency is an amount of time it takes a processing unit to perform an identified operation. Some examples of an identified operation are delivering a data packet from a source to a destination, and executing an identified set of computer instructions in response to an input value. Improving latency refers to reducing the amount of time it takes the processing unit to perform the identified operation. Throughput is an amount of identified operations the processing unit performs in a time interval, for example an amount of data packets delivered during the time interval. Another example of a system's throughput is an amount of input values for which the processing unit executes the identified set of computer instructions in the time interval. Improving throughput refers to increasing the amount of identified operations the processing unit performs in the time interval.

In the field of computing, the term co-processor is used to describe a supplementary processing unit used to complement a primary processing unit of a system and facilitate improving performance of the system by offloading some processor-intensive tasks from the primary processing unit. As the demand for high performance computing increases, there is an increase in using co-processing to increase performance. Some co-processors are designed to perform a unique task. A commonly known co-processor is a floating-point processor, for performing floating point arithmetic tasks. Other examples of unique tasks which may be performed by a co-processor include network input-output interface tasks, encryption, string processing, graphics processing, linear algebra processing, machine learning processing, and signal processing. Other co-processors may be configured to execute arbitrary parts of a computer program, not characterized as a unique task.

Co-processing is different from distributed processing. In a distributed system, a problem is divided into a plurality of independent tasks, each solved by one or more of a plurality of processing units operating substantially independent of each other, possibly communicating therebetween. In co-processing, a co-processor supplements functionality of a primary processing unit and operates in conjunction with the primary processing unit.

There is a need to delegate parts of a computer program to be executed by one or more co-processors.

SUMMARY OF THE INVENTION

Some embodiments of the present disclosure describe executing a software program in a heterogeneous computing system comprising a plurality of processing units, each having one of a plurality of computer architectures.

The foregoing and other objects are achieved by the features of the independent claims. Further implementation forms are apparent from the dependent claims, the description and the figures.

The foregoing and other objects are achieved by the features of the independent claims. Further implementation forms are apparent from the dependent claims, the description and the figures.

According to a first aspect of the invention, an apparatus for executing a software program comprises a plurality of processing units and at least one hardware processor adapted for: in an intermediate representation of the software program, where the intermediate representation comprises a plurality of blocks, each associated with one of a plurality of execution blocks of the software program and comprising a set of intermediate instructions, identifying a calling block and a target block, where the calling block comprises at least one control-flow intermediate instruction to execute at least one target intermediate instruction of the target block; generating a target set of executable instructions using the target block; generating a calling set of executable instructions using the calling block and at least one computer control instruction for invoking the target set of executable instructions, when the calling set of executable instructions is executed by a calling processing unit and the target set of executable instructions is executed by a target processing unit; configuring the calling processing unit for executing the calling set of executable instructions; and configuring the target processing unit for executing the target set of executable instructions. Identifying the calling block and the target block in an intermediate representation of the software program allows dynamic generation of the calling set of executable instructions and additionally or alternatively the target set of executable instructions, for example during runtime of the software program, and thus allows dynamic configuration of the calling processing unit and additionally or alternatively the target processing unit. Dynamic configuration of the calling processing unit and additionally or alternatively the target processing unit facilitates increasing performance of a system executing the software program by delegating execution of the calling block and additionally or alternatively the target block to one or more co-processors.

According to a second aspect of the invention, a method for executing a software program comprises: in an intermediate representation of the software program, where the intermediate representation comprises a plurality of blocks, each associated with one of a plurality of execution blocks of the software program and comprising a set of intermediate instructions, identifying a calling block and a target block, where the calling block comprises at least one control-flow intermediate instruction to execute at least one target intermediate instruction of the target block; generating a target set of executable instructions using the target block; generating a calling set of executable instructions using the calling block and at least one computer control instruction for invoking the target set of executable instructions, when the calling set of executable instructions is executed by a calling processing unit of a plurality of processing units and the target set of executable instructions is executed by a target processing unit of the plurality of processing units; configuring the calling processing unit for executing the calling set of executable instructions; and configuring the target processing unit for executing the target set of executable instructions.

With reference to the first and second aspects, in a first possible implementation of the first and second aspects of the present invention a first computer architecture of the calling processing unit is different from a second computer architecture of the target processing unit. Optionally, at least one of the first computer architecture and the second computer architecture are selected from a group of computer architectures consisting of: a complex instruction set computer (CISC) architecture, a reduced instruction set computer (RISC) architecture, an x86-family based computer architecture, an International Business Machine (IBM) Power-family based computer architecture, and an ARM-family based computer architecture. Optionally, the target processing unit is selected from the group of processing units consisting of: a central processing unit, a multi-core central processing unit (CPU), a data processing unit (DPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions. Optionally, the calling set of executable instructions comprises a plurality of conversion instructions, implementing an application binary interface applied to the at least one control-flow intermediate instruction to convert between the first computer architecture of the calling processing unit and the second computer architecture of the target processing unit. Optionally, the target block comprises a plurality of target metadata values and generating the target set of executable instructions comprises generating a plurality of converted target metadata values using the plurality of target metadata values according to the second computer architecture of the target processing unit. Using a calling processing unit having a computer architecture different from another computer architecture of the target processing unit facilitates reducing cost of implementation, and additionally or alternatively cost of operation, of a system implemented according to the present disclosure without significantly impacting system performance when executing the software program by allowing at least one of the calling processing unit and the target processing unit to be cheaper than the respective other processing unit and additionally or alternatively designed to consume less power than the respective other processing unit. Implementing the application binary interface applied to the one or more control-flow intermediate instructions facilitates invoking the set of target executable instructions by the calling set of executable instructions, thus facilitates delegating the target block to the target processing unit for execution, improving performance of the system when executing the software program. Generating the plurality of converted target metadata values using the plurality of target metadata values according to the second computer architecture of the target processing unit facilitates executing the set of target executable instructions by the target processing unit and executing the set of calling executable instructions by the calling processing unit in a common execution context, thus increasing flexibility in identifying the target block for delegation to the target processing unit for execution, increasing performance of the system when executing the software program.

With reference to the first and second aspects, in a second possible implementation of the first and second aspects of the present invention the target processing unit is further configured for providing the calling processing unit with at least one value produced by the target processing unit executing at least some of the target set of instructions. Optionally, the calling processing unit is further configured for receiving the at least one value, produced by the target processing unit executing at least some of the target set of instructions, from the calling processing unit. Optionally, the calling processing unit is further configured for providing the target processing unit with at least one argument value. Providing the calling processing unit with one or more values produced by the target processing unit executing at least some of the target set of instructions, and additionally or alternatively providing the target processing unit with one or more argument values by the calling processing unit facilitates delegating the target block to the target processing unit for execution, thus improving performance of a system implemented according to the present disclosure when executing the software program.

With reference to the first and second aspects, in a third possible implementation of the first and second aspects of the present invention the target processing unit is further configured for instructing, after executing at least some other of the target set of instructions, the calling processing unit to execute at least some of the calling set of executable instructions. Optionally, the calling processing unit is further configured for: suspending execution of the calling set of executable instructions after executing the at least one computer control instruction for invoking the target set of executable instructions; and executing the at least some of the calling set of executable instructions in response to receiving an instruction from the target processing unit. Invoking execution of at least part of the calling set of executable instructions by the target processing unit facilitates providing the target processing unit access to one or more computing resources connected to the target processing unit, thus increasing flexibility in identifying the target block for delegation to the target processing unit for execution, increasing performance of the system when executing the software program.

With reference to the first and second aspects, in a fourth possible implementation of the first and second aspects of the present invention the calling set of executable instructions comprises at least one first memory access instruction to at least one memory address in an identified range of application memory addresses and the target set of executable instructions comprises at least one second memory access instruction to at least one other memory address in the identified range of application memory addresses. Optionally, the identified range of application memory addresses is one of: a range of physical memory addresses, a range of virtual memory addresses, a range of memory-mapped input-output addresses, and a range of bus addresses. Accessing an identified range of application memory addresses by both the calling set of executable instructions and the target set of executable instructions increases flexibility in identifying the target block for delegation to the target processing unit for execution, increasing performance of the system when executing the software program.

With reference to the first and second aspects, in a fifth possible implementation of the first and second aspects of the present invention the calling set of executable instructions comprises accessing at least one device using at least one device handle associated with the at least one device and the target set of executable instructions comprises accessing the at least one device using the at least one device handle. Optionally, the at least one device handle is at least one of: a network socket handle, an operating system kernel object handle, and a file descriptor. Accessing one or more devices by both the calling set of executable instructions and the target set of executable instructions increases flexibility in identifying the target block for delegation to the target processing unit for execution, increasing performance of the system.

With reference to the first and second aspects, in a sixth possible implementation of the first and second aspects of the present invention the at least one hardware processor is further adapted for: collecting a plurality of statistical values while executing at least part of the software program; and identifying the calling block and the target block according to the plurality of statistical values. Optionally, at least one of the plurality of statistical values indicative of one of: an outcome of executing a control-flow instruction, a data value of a variable of the software program, a memory access pattern, and a memory virtual address translation. Optionally, the at least one hardware processor is further adapted for inserting a plurality of telemetry intermediate instructions into the intermediate representation of the software program, for the purpose of collecting the plurality of statistical values. Identifying the calling block and the target block according to the plurality of statistical values increases accuracy of said identification, thus increasing performance of the system when executing the software program.

With reference to the first and second aspects, in a seventh possible implementation of the first and second aspects of the present invention the calling processing unit is the at least one hardware processor. Having the one or more hardware processors identifying the calling block and the target block executing the set of calling executable instructions, allows runtime identification of the calling block and target block, increasing accuracy of said identification, thus increasing performance of the system when executing the software program.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DESCRIPTION OF SPECIFIC EMBODIMENTS OF THE INVENTION

Some co-processors operate independently, without being invoked by a primary processing unit of a system. For example, a network interface co-processor may process received network packets with little, if any, involvement from the primary processing unit. Other co-processors receive instructions from the primary processing unit, for example a graphic processing unit (GPU) receiving instructions to render a digital image.

When two processing units of a system operate in conjunction, there may be a need to invoke operation of a target processing unit from a calling processing unit, for example invoking a co-processor from a primary processing unit. In another example, a co-processor may invoke a primary processing unit to access a resource the co-processor is not able to access independently, for example a non-volatile digital storage. In addition to a calling processing unit invoking a target processing unit, there exist cases where there is a need to pass one or more data values from the calling processing unit to the target processing unit, for example input arguments of an operation performed by the target processing unit. In addition, there may be a need to pass one or more other data values from the target processing unit back to the calling processing unit, for example an outcome value computed by the target processing unit.

In computing, the term Application Binary Interface (ABI) refers to an interface between two binary program modules describing in hardware-dependent format how data and computational routines are accessed. An interface between the two binary program modules may comprise a format of data structures. Additionally, or alternatively, the interface may comprise calling conventions for providing data as input to, and additionally or alternatively read as output from, computational routines.

In computing, the term architecture refers to the organization of components making up a computer system and the semantics or meaning of operations that guide the computer system's function. As used herewithin, the term "homogenous system" refers to a computing system having a plurality of processing units all having a common architecture. For example, a computing system having a plurality of central processing units (CPUs) having a common architecture is a homogenous system. Similarly, the term "heterogeneous system" refers to a system having a plurality of processing units where at least one processing unit of the plurality of processing units has an architecture different from another architecture of another of the plurality of processing units. For example, a system having a CPU and a GPU is a heterogeneous system. Another example of a heterogeneous system is a system having a CPU and a field-programmable gate array (FPGA) co-processor. Another example of a heterogeneous system is a system having a CPU having a complex instruction set computer (CISC) based architecture and another CPU having a reduced instruction set computer (RISC) based architecture. An additional example of a heterogeneous system is a system having two or more CPUs where each supports a different instruction set architecture (ISA), for example one CPU supporting an Intel x86 ISA and another CPU supporting Motorola 68000 series ISA, or one CPU supporting an ARM ISA and another CPU supporting a RISC-V ISA. In yet another example of a heterogeneous system, the heterogeneous system has a high-performance CPU having a high power consumption and an efficient CPU having a low power consumption.

When executing a software program comprising a plurality of execution blocks comprising a calling execution block and a target execution block, we say the calling execution block invokes the target execution block when the calling execution block comprises one or more control-flow instructions to execute one or more instructions of the target calling block. When executing the software program by a plurality of processing units, it may be that a calling processing unit executing the calling execution block invokes the target execution block executed by a target processing unit. In such a case, invoking the target execution block by the calling execution block requires producing a set of instructions executed by the calling processing unit according to an ABI describing an interface to the target processing unit, i.e. the set of instructions implements the ABI. Optionally, implementing the ABI comprises adding to the set of instructions one or more conversion instructions to convert between an architecture of the calling processing unit and another architecture of the target processing unit. Optionally, the one or more conversion instructions are added to the set of instructions executed by the calling processing unit. Optionally, the one or more conversion instructions are added to other instructions executed by the target processing unit. Optionally, implementing the ABI comprises organizing one or more data values in a memory area, for example a stack, in compliance with the other architecture of the target unit, for example according to one or more of a data encoding of the other architecture, a byte alignment of the other architecture, and a byte order of the other architecture.

In addition, there may be a need to provide the target processing unit, via the ABI, with an execution state of the calling processing unit, for example to share access privileges, for example to a file or a memory area, and additionally or alternatively to share one or more data values. Other examples of a shared execution state include a network socket context, a view of network topology, and a virtualization context, for example Single Root Input/Output Virtualization (SRIOV). An execution state may include, but is not limited to, one or more of a thread identification value, a process identification value, an instruction address of an instruction to execute after executing a return instruction (a return address), and one or more formal argument values of a function. Optionally, the calling execution block and the target execution block access a common range of application memory addresses of the software program. Some examples of an application memory address include, but are not limited to, a physical memory address, a virtual memory address, a memory-mapped input-output address, and a bus address. Optionally, the target execution block comprises accessing one or more devices of the computerized system, for example a disk drive or a network adapter. Optionally, there is a need to provide the target processing unit, via the ABI, with one or more device handles associated with the one or more devices.

When it is possible to identify in advance one or more execution blocks to be executed by a co-processor, and when the co-processor is known when compiling the software program from source files, one or more appropriate sets of instructions may be produced to instruct the co-processor to execute the one or more execution blocks. However, performance improvements achieved by producing instructions for the co-processor in advance are limited by an ability to identify such tasks that improve a system's performance when delegated to one or more co-processors.

In a homogenous system, where a plurality of processing units has a common architecture and thus a common ABI, an execution block may be compiled to invoke another execution block executed by another processing unit without determining in advance which of the plurality of processing units will execute the other execution block. However, performance improvements achieved in a homogenous system are limited by the common architecture's support for the dynamically allocated tasks. For example, when each of the plurality of processing units is a CPU, delegating one or more floating point arithmetic operations to another CPU may provide less performance improvement than delegating the one or more floating point arithmetic operations to a floating-point processor.

A heterogeneous system optionally comprises a first target processing unit having a first architecture and a second target processing unit having a second architecture. In such a heterogeneous system, a set of instructions executed by a calling processing unit and invoking an execution block executed by the first target processing unit is produced according to a first ABI of the first architecture. In such a heterogeneous system, the set of instructions might not be used to invoke the same execution block when executed by the second target processing unit, as a second ABI for the second architecture may be different from the first ABI.

In computer programming, an intermediate representation of a computer program is a representation of the computer program in an abstract machine language which expresses operations of a machine (processing unit) while not being specific to any particular machine.

The present disclosure, in some embodiments described herewithin, proposes using an intermediate representation of a software program to dynamically configure a calling processing unit and a target processing unit. Optionally, the intermediate representation comprises a plurality of blocks. According to such embodiments, using the intermediate representation the calling processing unit is configured for executing a calling block of the plurality of blocks and the target processing unit is configured for executing a target block of the plurality of blocks, where the calling block invokes the target block. To do so, in such embodiments the present disclosure proposes using the intermediate representation to dynamically generate a calling set of executable instructions using the calling block and a target set of executable instructions using the target block, and configuring the calling processing unit for executing the calling set of executable instructions and the target processing unit for executing the target set of executable instructions. Optionally, executing the software program comprises the calling processing unit executing the calling set of executable instructions and the target processing unit executing the target set of executable instructions. Optionally, executing the software program comprises generating the calling set of executable instructions and additionally or alternatively generating the target set of executable instructions. Optionally, executing the software program comprises configuring the calling processing unit for executing the calling set of executable instructions and additionally or alternatively configuring the target processing unit for executing the target set of executable instructions. Optionally, dynamic generation of the calling set of executable instructions and the target set of executable instructions is during run-time of the software program, i.e. just-in-time (JIT) compilation. Optionally, a first architecture of the calling processing unit is different from a second architecture of the target processing unit. Using the intermediate representation of the plurality of blocks allows dynamic generation of the calling set of executable instructions and the target set of executable instructions to allow dynamic configuration of the calling processing unit and the target processing unit, and thus allows dynamic selection of the calling processing unit and the target processing unit from a plurality of processing units. Dynamic configuration of the calling processing unit and the target processing unit facilitates improving performance of the system when executing the software program, for example improving latency and additionally or alternatively improving throughput, compared to static configuration of the calling processing unit and the target processing unit.

A block of the plurality of blocks of the intermediate representation may invoke another block of the intermediate representation by comprising one or more control-flow intermediate instructions to execute one or more intermediate instructions of the other block. Some examples of a control-flow intermediate instruction are a function call intermediate instruction, a jump intermediate instruction and a conditional branch intermediate instruction. Optionally, the calling block and the target block are identified such that the calling block comprises one or more control-flow intermediate instructions to execute one or more target intermediate instructions of the target block.

In addition, the one or more control-flow intermediate instructions optionally comprise the calling processing unit providing the target processing unit with one or more input values, for example one or more formal arguments of a function. In addition, the target processing unit is optionally configured for providing the calling processing unit with one or more values produced by the target processing unit, for example an outcome of executing the target block.

In addition, in some embodiments described herewithin, the calling block and the target block are identified according to a plurality of statistical values collected while executing at least part of the software program. Some examples of a statistical value are: an outcome of executing a control-flow instruction, a data value of a variable of the software program, a memory access pattern and a memory virtual address translation. Such statistical values allow identification of one or more likely paths of execution of the software program. Identifying the calling block and the target block according to the plurality of statistical values increases accuracy of identifying the calling block and the target block in a manner that increases improvement to the performance of the system when executing the software program. Optionally, a plurality of telemetry intermediate instructions are inserted in the intermediate representation of the software program, optionally for the purpose of collecting the plurality of statistical values.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-intime (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
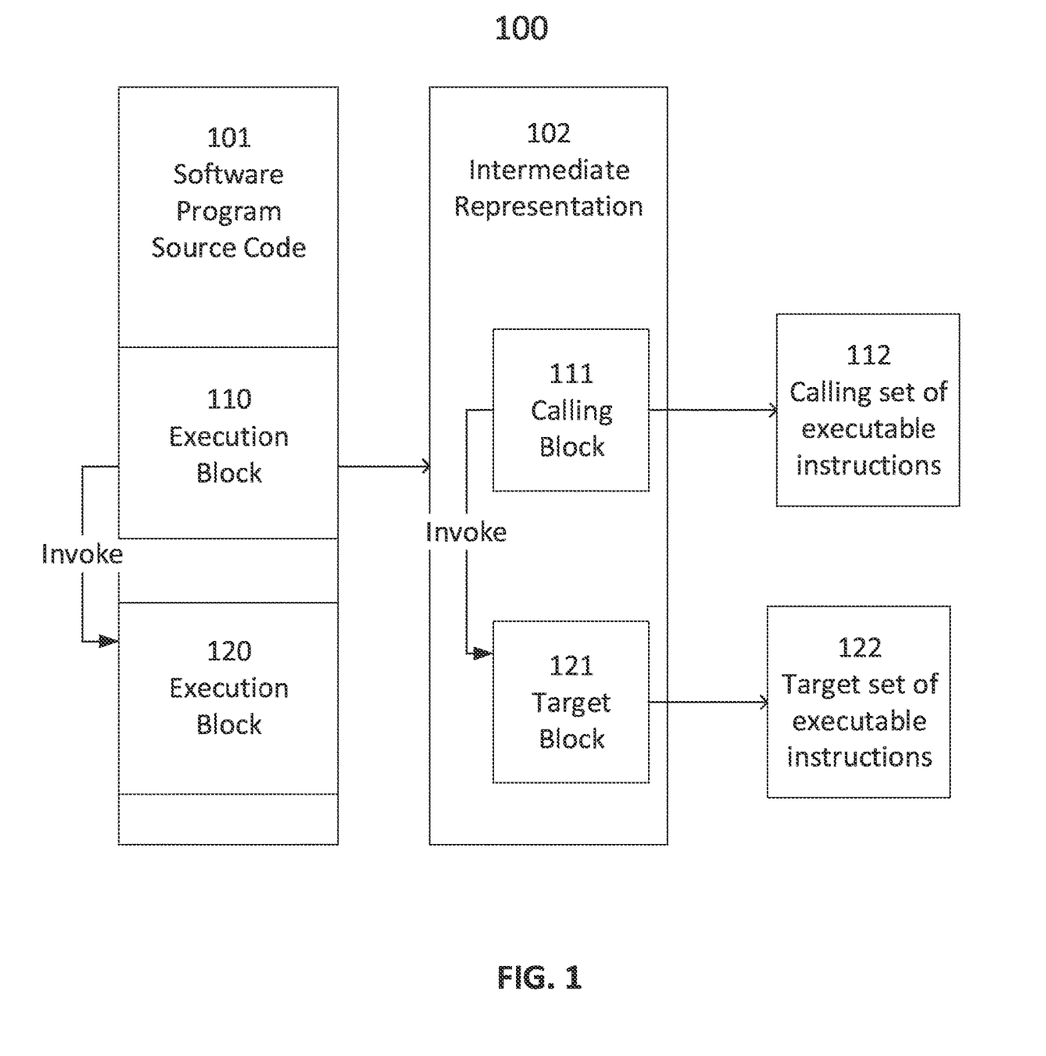
FIG. 1 is a schematic block diagram of an exemplary software program, according to some embodiments.

Reference is now made to FIG. 1, showing a schematic block diagram of an exemplary software program 100, according to some embodiments. In such embodiments, source code 101 of the software program comprises a plurality of execution blocks, including calling execution block 110 and target execution block 120. Optionally, calling execution block 110 invokes target execution block 120. Optionally, calling execution block 110 comprises one or more control-flow source-code instructions to execute one or more source-code instructions of target execution block 120.

Optionally, intermediate representation 102 is a representation of source code 101 that is not specific to a computer architecture, for example in an intermediate language. Some examples of an intermediate language used for intermediate representation are Register Transfer Language (RTL), C programming language, MATLAB precompiled code, LLVM Developer Group intermediate representation language, GNU Compiler Collection intermediate representation language, Microsoft P-code and Java bytecode. Optionally, intermediate representation 102 is in a language targeting a virtual machine. Optionally, intermediate representation 102 comprises a plurality of blocks, including calling block 111 and target block 121. Optionally, each of the plurality of blocks is associated with one of the plurality of execution blocks of source code 101 and comprises a plurality of intermediate instructions. In this example, calling block 111 is associated with calling execution block 110 and target block 121 is associated with target execution block 120.

In the association between each of the plurality of block on intermediate representation 102 and one of the plurality of execution blocks of source code 101, intermediate representation 102 optionally preserves execution block 110 invoking execution block 120. Optionally, calling block 111 comprises one or more control-flow intermediate instructions to execute one or more target intermediate instructions of target block 121.

To execute the software program on one or more processing units, one or more sets of executable instructions are produced, each for one of the plurality of blocks of intermediate representation 102. Thus, calling set of executable instructions 112 is optionally produced for calling block 111, and target set of executable instructions 122 is optionally produced for target block 121.

Figure 2:
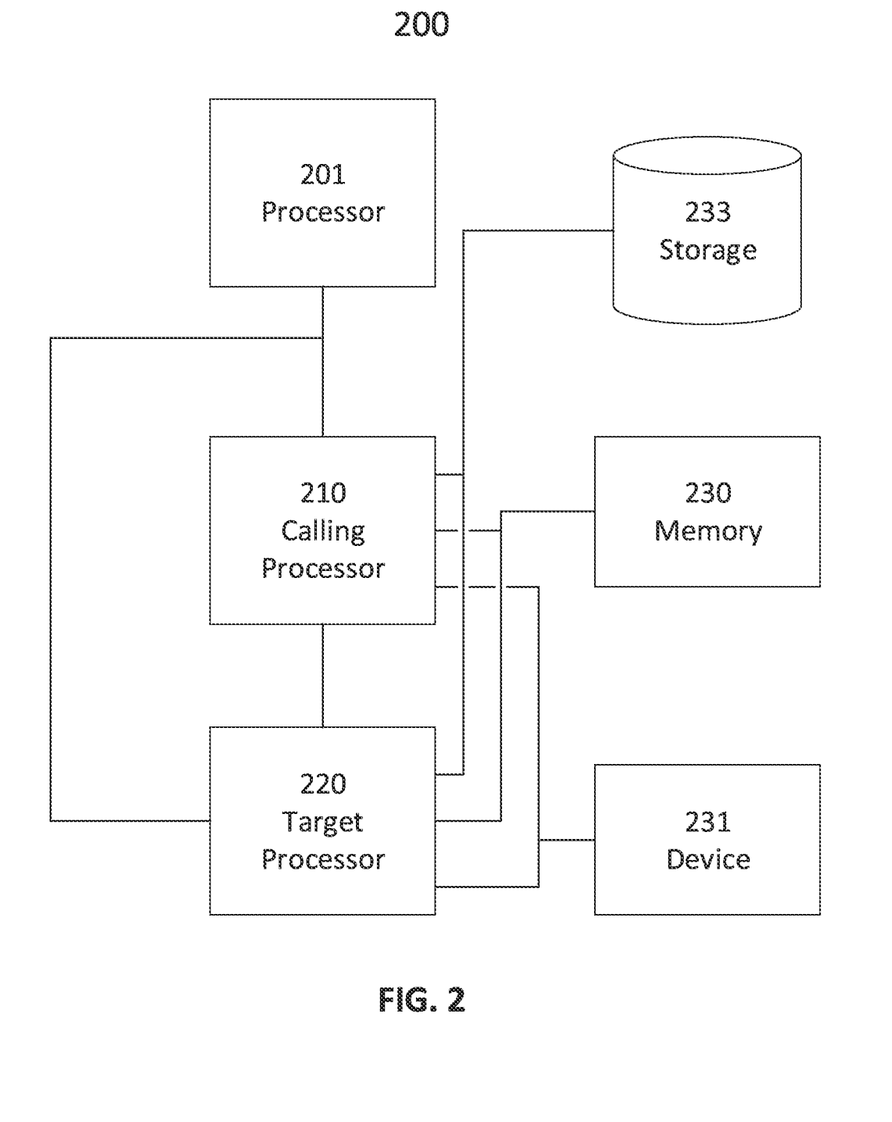
FIG. 2 is a schematic block diagram of an exemplary apparatus for executing a software program, according to some embodiments.

Reference is now made also to FIG. 2, showing a schematic block diagram of an exemplary apparatus 200 for executing a software program, according to some embodiments. In such embodiments, at least one hardware processor 201 is connected to a plurality of processing units, for example comprising calling processing unit 210 and target processing unit 220. Optionally, one or more of the plurality of processing units are selected from a group of processing units comprising, but not limited to: a central processing unit, a multi-core central processing unit (CPU), a data processing unit (DPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

Optionally, the calling processing unit has a first computer architecture, selected from a group of computer architectures comprising, but not limited to: a complex instruction set computer (CISC) architecture, a reduced instruction set computer (RISC) architecture, an x86-family based computer architecture, an International Business Machine (IBM) Power-family based computer architecture, and an ARM-family based computer architecture. Optionally, the target processing unit has a second computer architecture selected from the group of computer architectures. Optionally, the first computer architecture is different from the second computer architecture. Optionally, the first computer architecture is the second computer architecture.

Optionally, at least one hardware processor 201 is connected to the plurality of processing units via one or more digital communication networks, for example a Local Area Network (LAN) such as an Ethernet network or a Wi-Fi network, or a Wide Area Network (WAN) such as the Internet. Optionally, calling processing unit 210 is connected to target processing unit 220, optionally via a digital communication network. Optionally target processing unit 220 is electrically coupled to calling processing unit 210, for example via a memory bus, a peripheral component expansion bus, or an interconnect, some examples being Intel QuickPath Interconnect (QPI) and peripheral component interconnect express (PCIe).

Optionally, apparatus 200 comprises memory 230, optionally connected to one or more of the plurality of processing units. Optionally, memory 230 is a random access memory (RAM), for example comprising a static RAM (SRAM) and additionally or alternatively a dynamic RAM (DRAM). Some examples of DRAM are synchronous dynamic RAM (SDRAM), double data rate SDRAM (DDR), graphics double data rate SDRAM (GDDR), and low power double data rate SDRAM (LPDDR), and high-bandwidth RAM (HBM). Optionally, apparatus 200 comprises one or more non-volatile digital storage 233, optionally connected to one or more of the plurality of processing units. Some examples of a non-volatile digital storage include a hard disk drive, a solid state drive, a network connected storage and a storage network.

Optionally, apparatus 200 comprises one or more other devices 231, optionally connected to one or more of the plurality of processing units. Some example of a device are a display device and a network adapter. Optionally, one or more other devices 231 are electrically coupled to the one or more processing units.

For brevity, henceforth the term "processing unit" is also used to mean "at least one hardware processor".

In some embodiments, to execute software program 100 apparatus 200 implements the following optional method.

Figure 3:
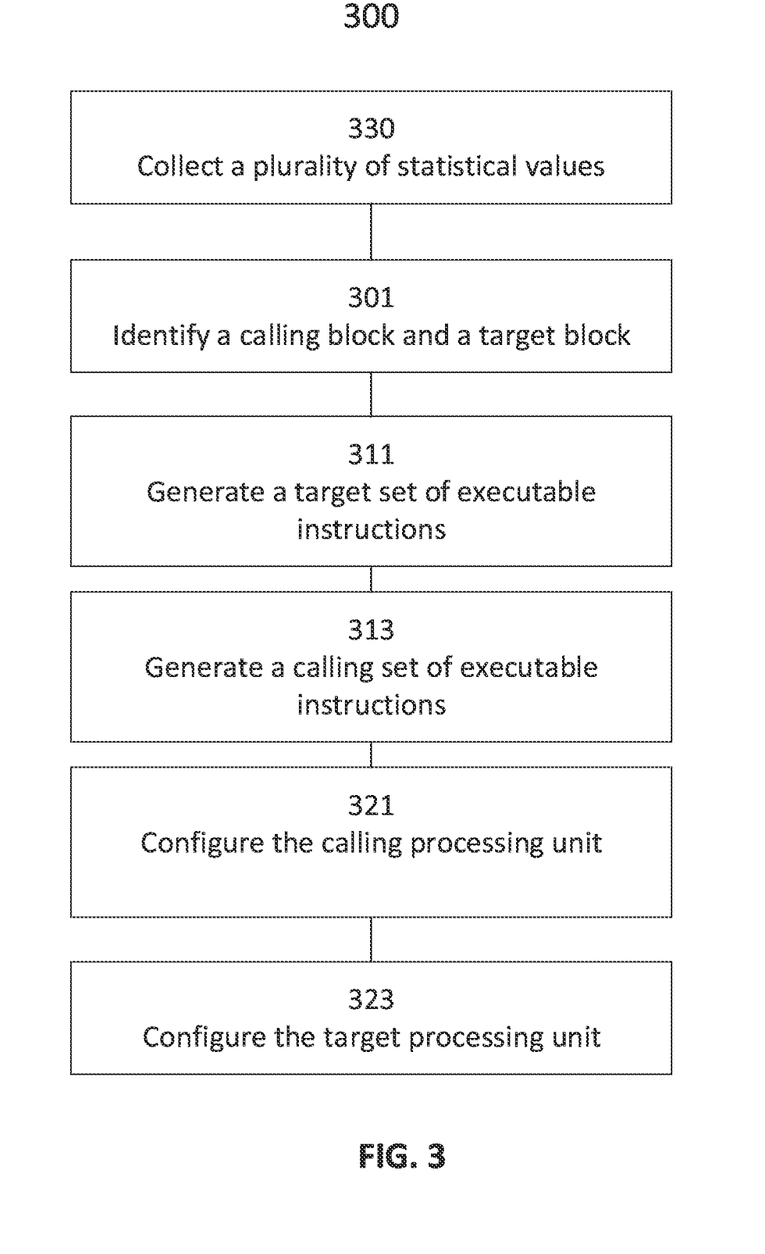
FIG. 3 is a flowchart schematically representing an optional flow of operations, according to some embodiments.

Reference is now made also to FIG. 3, showing a flowchart schematically representing an optional flow of operations 300, according to some embodiments. In such embodiments, in 301 processing unit 201 identifies calling block 111 and target block 121 in the plurality of blocks of intermediate representation 102. Optionally, calling block 111 comprises one or more control-flow intermediate instructions to execute one or more target intermediate instructions of target block 121. In 311, processing unit 201 optionally generates target set of executable instructions 122 using target block 121.

In 313, processing unit 201 optionally generates calling set of executable instructions 112 using calling block 111 and one or more computer control instructions. Optionally, the one or more computer control instructions invoke target set of executable instructions 122 when calling set of executable instructions 112 is executed by calling processing unit 210 and target set of executable instructions 122 is executed by target processing unit 220. Optionally, calling set of executable instructions 112 comprises a plurality of conversion instructions, implementing an ABI applied to the one or more control-flow intermediate instructions to convert between the first computer architecture of calling processing unit 210 and the second computer architecture of target processing unit 220.

Optionally, target block 121 comprises a plurality of target metadata values. Optionally, some of the plurality of target metadata values describe an execution context for executing target block 121. Some examples of a target metadata value a stack memory value and a program counter value. Optionally, generating target set of executable instructions 122 comprises generating a plurality of converted target metadata values using the plurality of target metadata values according to the second computer architecture of target processing unit 220.

Optionally, calling set of executable instructions 112 and target set of executable instructions 122 both access a common range of application memory addresses, such that calling set of executable instructions 112 comprises one or more first memory access instructions to one or more memory addresses in the common range of application memory addresses and target set of executable instructions 122 comprises one or more second memory access instructions to one or more other memory addresses in the common range of application memory addresses. Optionally, the common range of application memory addresses is a range of physical memory addresses, for example a range of physical addresses in memory 230. Optionally, the common range of application memory addresses is a range of virtual memory addresses. Optionally, the common range of application memory addresses is a range of bus addresses. Optionally, the common range of application memory addresses is a range of memory-mapped input-output addresses.

Optionally, calling set of executable instructions 112 and target set of executable instructions 122 share a common execution state, for example to provide common access privileges. Optionally, a calling thread identifier of calling set of executable instructions 112 is associated with a target thread identifier of target set of executable instructions 122. In a possible example, calling set of executable instructions 112 and target set of executable instructions 122 both access one or more device 231 using a common device handle. Some examples of a device handle are a network socket handle, an operating system kernel object handle, and a file descriptor. Thus, in this example, calling set of executable instructions 112 comprises accessing one or more device 231 using one or more device handles associated with one or more device 231 and, in this example, target set of executable instructions 122 comprises accessing one or more device 231 using the one or more device handles.

Optionally, in 321 processing unit 201 configures calling processing unit 210 for executing calling set of executable instructions 112. Optionally, in 323 processing unit 201 configures target processing unit 220 for executing target set of executable instructions 122.

Optionally, calling processing unit 210 is processing unit 201, and thus processing unit 201 is configured for executing calling set of executable instructions 112. Optionally, processing unit 201 executes method 300 while executing software program 100, i.e. JIT compilation.

When executing software program 100, calling processing unit 210 and target processing unit 220 may communicate with each other.

Figure 4:
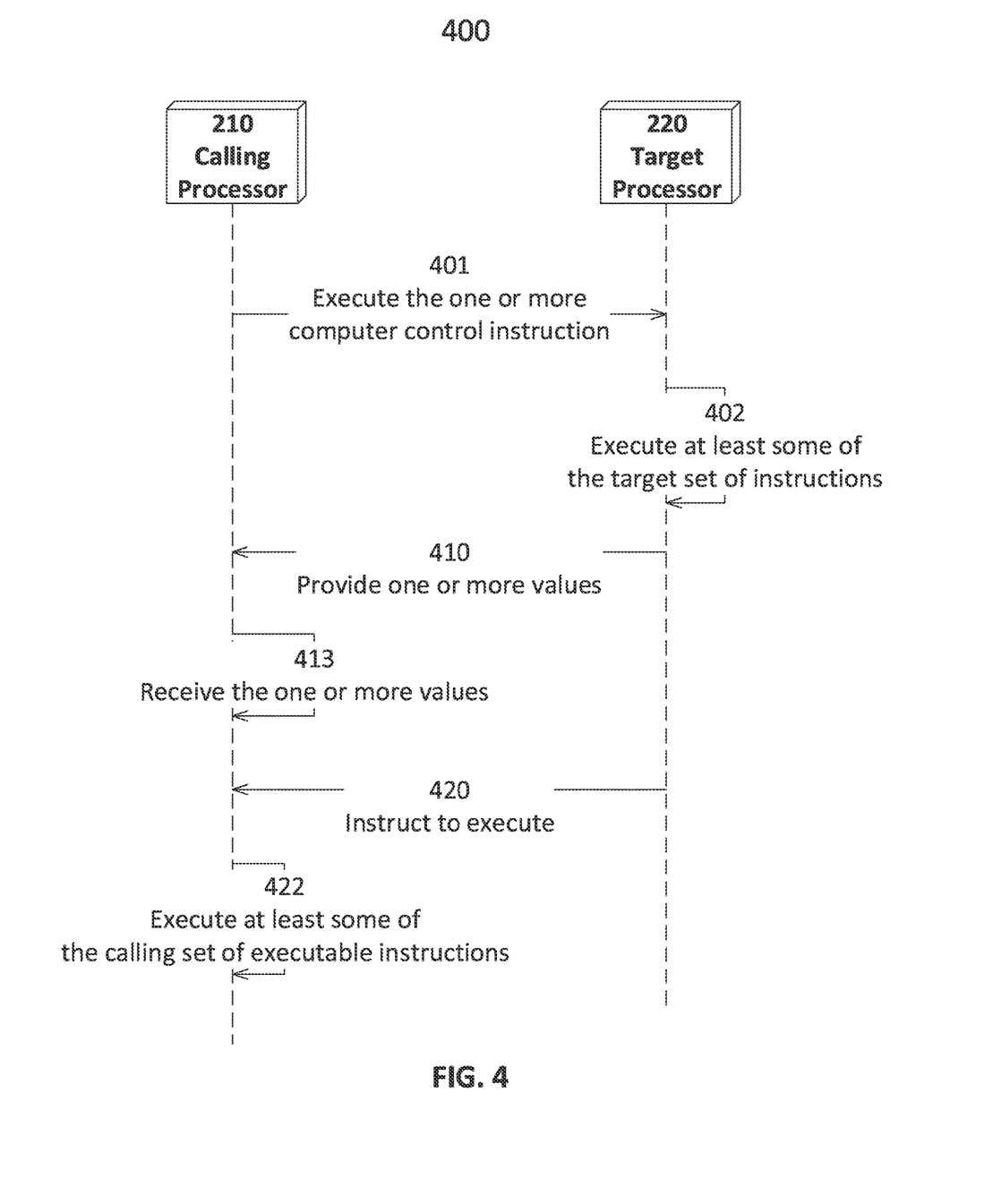
FIG. 4 is a sequence diagram of another optional flow of operations, according to some embodiments.

Reference is now made also to FIG. 4, showing a sequence diagram of another optional flow of operations 400, according to some embodiments. In such embodiments, in 401 calling processing unit 210 executes the one or more computer control instruction for invoking target set of executable instructions 122. Optionally, configuring calling processing unit 210 to execute the one or more computer control instruction comprises configuring calling processing unit 210 for providing target processing unit 220 with one or more argument values, such that in 401 calling processing unit 210 optionally provides target processing unit 220 with one or more argument values. Optionally, in 402 target processing unit 220 executes at least some of target set of executable instructions 122. Optionally, in 402 target processing unit 220 produces one or more values. Optionally, configuring target processing unit 220 to execute target set of executable instructions 122 comprises configuring target processing unit 220 for providing calling processing unit 210 with the one or more values, such that in 410 target processing unit 220 optionally provides calling processing unit 210 with the one or more values. Optionally, configuring calling processing unit 210 comprises configuring calling processing unit 210 for receiving the one or more values, such that in 413 calling processing unit 210 optionally receives the one or more values.

Optionally, target block 111 returns control of execution of software program 100 to calling block 112. Optionally, processing unit 201 optionally further configures target processing unit 220 for instructing calling processing unit 210 to execute at least some of calling set of executable instructions 112, such that in 420 target processing unit 220 optionally instructs calling processing unit 210 to execute the at least some of calling set of executable instructions 112 and in 422 calling processing unit 210 optionally executes the at least some of calling set of executable instructions 112. Optionally, target processing unit 220 instructs calling processing unit 210 using a software signal, some examples being an operating system process signal, a hardware queue, a hardware mailbox, a message, a communication pipe, and a shared memory area.

Optionally, target processing unit 220 executes 420 after executing some other of the target set of executable instructions 122.

Optionally, calling processing unit 210 is further configured for suspending execution of calling set of executable instructions 112 after executing 401. Optionally, calling processing unit 210 executes 422 is response to receiving the instruction in 420. Optionally, target processing unit 220 instructs calling processing unit 210 to execute the at least some of calling set of executable instructions 112 in order to access a resource not shared with target processing unit 220. Optionally, target processing unit 220 instructs calling processing unit 210 to execute the at least some of calling set of executable instructions 112 after completing execution of target set of executable instructions 122.

Reference is now made again to FIG. 1. Optionally, in 330, processing unit 201 collects a plurality of statistical values while executing at least part of software program 100. Optionally, at least one of the plurality of statistical values is indicative of an outcome of executing a control-flow instruction. Optionally, at least one other of the plurality of statistical values is indicative of a value of software program 100, for example an input value to a function or to a conditional branch instruction. Optionally, at least one of the plurality of statistical values is indicative of a memory access pattern, optionally of a plurality of memory accesses to memory 230. Optionally, the memory access pattern includes an amount of accesses to a memory address or to a range of memory addresses. Optionally, at least one of the plurality of statistical values is indicative of a memory address translation.

Optionally, to collect the plurality of statistical values, processing unit 201 is further adapted for inserting a plurality of telemetry intermediate instructions into intermediate representation 102. Optionally, processing unit 201 is further adapted for using hot-patching techniques to modify software program while executing thereof, for the purpose of collecting the plurality of statistical values.

Optionally, processing unit 201 receives at least some of the plurality of statistical values from one or more of the plurality of processing units.

Optionally, processing unit 201 identifies the calling block and the target block in 301 according to the plurality of statistical values.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant intermediate representations and computer architectures will be developed and the scope of the terms "intermediate representation" and "computer architecture" are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus comprising a plurality of processing units and at least one hardware processor adapted for:
    generating a target set of executable instructions using a target block identified in a plurality of blocks of an intermediate representation of a software program, each of the plurality of blocks associated with one of a plurality of execution blocks of the software program and comprising a set of intermediate instructions;
    generating a calling set of executable instructions using a calling block identified in the plurality of blocks of the intermediate representation and using at least one computer control instruction for invoking the target set of executable instructions, when the calling set of executable instructions is executed by a calling processing unit and the target set of executable instructions is executed by a target processing unit;
    configuring at least one of the calling processing unit and the target processing unit for executing the calling set of executable instructions and the target set of executable instructions, respectively.

2. The apparatus of claim 1, wherein the at least one hardware processor is further adapted for identifying the calling block and the target block in the plurality of blocks of the intermediate representation of the software program.

3. The apparatus of claim 1, wherein the target processing unit is further configured for providing the calling processing unit with at least one value produced by the target processing unit executing at least some of the target set of executable instructions.

4. The apparatus of claim 3, wherein the calling processing unit is further configured for receiving the at least one value, produced by the target processing unit executing at least some of the target set of executable instructions, from the calling processing unit.

5. The apparatus of claim 1, wherein the calling processing unit is further configured for providing the target processing unit with at least one argument value.

6. The apparatus of claim 1, wherein the target processing unit is further configured for instructing, after executing at least some other of the target set of executable instructions, the calling processing unit to execute at least some of the calling set of executable instructions.

7. The apparatus of claim 6, wherein the calling processing unit is further configured for:
    suspending execution of the calling set of executable instructions after executing the at least one computer control instruction for invoking the target set of executable instructions; and
    executing the at least some of the calling set of executable instructions in response to receiving an instruction from the target processing unit.

8. The apparatus of claim 1, wherein the target processing unit is selected from a group of processing units consisting of: a central processing unit, a multi-core central processing unit (CPU), a data processing unit (DPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

9. The apparatus of claim 1, wherein a first computer architecture of the calling processing unit is different from a second computer architecture of the target processing unit.

10. The apparatus of claim 9, wherein the calling block comprises at least one control-flow intermediate instruction to execute at least one target intermediate instruction of the target block; and
    wherein the calling set of executable instructions comprises a plurality of conversion instructions, implementing an application binary interface applied to the at least one control-flow intermediate instruction to convert between the first computer architecture of the calling processing unit and the second computer architecture of the target processing unit.

11. The apparatus of claim 9, wherein the target block comprises a plurality of target metadata values; and
wherein generating the target set of executable instructions comprises generating a plurality of converted target metadata values using the plurality of target metadata values according to the second computer architecture of the target processing unit.

12. The apparatus of claim 1, wherein the calling set of executable instructions comprises at least one first memory access instruction to at least one memory address in an identified range of application memory addresses; and
wherein the target set of executable instructions comprises at least one second memory access instruction to at least one other memory address in the identified range of application memory addresses.

13. The apparatus of claim 12, wherein the identified range of application memory addresses is one of: a range of physical memory addresses, a range of virtual memory addresses, a range of memory-mapped input-output addresses, and a range of bus addresses.

14. The apparatus of claim 1, wherein the calling set of executable instructions comprises accessing at least one device using at least one device handle associated with the at least one device; and
wherein the target set of executable instructions comprises accessing the at least one device using the at least one device handle.

15. The apparatus of claim 14, wherein the at least one device handle is at least one of: a network socket handle, an operating system kernel object handle, and a file descriptor.

16. The apparatus of claim 1, wherein the at least one hardware processor is further adapted for identifying the calling block and the target block according to a plurality of statistical values collected while at least part of the software program is executed.

17. The apparatus of claim 16, wherein the at least one hardware processor is further adapted for collecting the plurality of statistical values while executing the at least part of the software program.

18. The apparatus of claim 16, wherein at least one of the plurality of statistical values is indicative of one of: an outcome of executing a control-flow instruction, a data value of a variable of the software program, a memory access pattern, and a memory virtual address translation.

19. The apparatus of claim 16, wherein the at least one hardware processor is further adapted for: inserting a plurality of telemetry intermediate instructions into the intermediate representation of the software program, for collecting the plurality of statistical values.

20. The apparatus of claim 1, wherein the calling processing unit is the at least one hardware processor.

21. A method for executing a software program, comprising:
generating a target set of executable instructions using a target block identified in a plurality of blocks of an intermediate representation of a software program, each of the plurality of blocks associated with one of a plurality of execution blocks of the software program and comprising a set of intermediate instructions;
generating a calling set of executable instructions using a calling block identified in the plurality of blocks of the intermediate representation and using at least one computer control instruction for invoking the target set of executable instructions, when the calling set of executable instructions is executed by a calling processing unit and the target set of executable instructions is executed by a target processing unit; and
configuring at least one of the calling processing unit and the target processing unit for executing the calling set of executable instructions and the target set of executable instructions, respectively.

22. A software program product for executing a software program, comprising:
a non-transitory computer readable storage medium;
first program instructions for: generating a target set of executable instructions using a target block identified in a plurality of blocks of an intermediate representation of a software program, each of the plurality of blocks associated with one of a plurality of execution blocks of the software program and comprising a set of intermediate instructions; and
second program instructions for: generating a calling set of executable instructions using a calling block identified in the plurality of blocks of the intermediate representation and using at least one computer control instruction for invoking the target set of executable instructions, when the calling set of executable instructions is executed by a calling processing unit and the target set of executable instructions is executed by a target processing unit; and
third program instructions for: configuring at least one of the calling processing unit and the target processing unit for executing the calling set of executable instructions and the target set of executable instructions, respectively;
wherein the first, second, and third program instructions are executed by at least one computerized processor from the non-transitory computer readable storage medium.

* * * * *

UNITED STATES PATENT AND TRADEMARK OFFICE
CERTIFICATE OF CORRECTION

PATENT NO. : 11,630,669 B2
APPLICATION NO. : 17/406151
DATED : April 18, 2023
INVENTOR(S) : Elad Raz et al.

It is certified that error appears in the above-identified patent and that said Letters Patent is hereby corrected as shown below:

On the Title Page

Item (54) and in the Specification, Column 1, Line 2, in the Title, Change "MULTIARCHITECTURE" to --MULTI-ARCHITECTURE--

Signed and Sealed this
Fourteenth Day of November, 2023

Katherine Kelly Vidal
*Director of the United States Patent and Trademark Office*